(12) United States Patent
Hobbs et al.

(10) Patent No.: US 12,318,969 B2
(45) Date of Patent: Jun. 3, 2025

(54) COATED FORMING TOOL

(71) Applicant: Adient US LLC, Plymouth, MI (US)

(72) Inventors: Michael W. Hobbs, Stamping Ground, KY (US); Patricia J. McClarren, Ypsilanti, MI (US); Adam Cody McGraw, Portsmouth, OH (US); Charles C. Crothers, Greenfield, OH (US); Robert E. Carpenter, Blue Springs, MO (US)

(73) Assignee: Adient US LLC, Plymouth, MI (US)

( * ) Notice: Subject to any disclaimer, the term of this patent is extended or adjusted under 35 U.S.C. 154(b) by 691 days.

(21) Appl. No.: 17/646,878

(22) Filed: Jan. 4, 2022

(65) Prior Publication Data
US 2023/0211527 A1 Jul. 6, 2023

(51) Int. Cl.
*B29C 33/56* (2006.01)
*B29C 44/02* (2006.01)
*B29C 44/58* (2006.01)
*B29K 23/00* (2006.01)
*B29L 31/58* (2006.01)
*B60N 2/58* (2006.01)

(52) U.S. Cl.
CPC ............... *B29C 33/56* (2013.01); *B29C 44/02* (2013.01); *B29C 44/588* (2013.01); *B60N 2/5891* (2013.01); *B29K 2023/12* (2013.01); *B29L 2031/58* (2013.01)

(58) Field of Classification Search
CPC ......... B29C 33/56; B29C 33/68; B29C 44/02; B29C 44/025; B29C 44/027; B29C 44/58
See application file for complete search history.

(56) References Cited

U.S. PATENT DOCUMENTS

2015/0011666 A1   1/2015   McEvoy

FOREIGN PATENT DOCUMENTS

| DE | 102012211911 A1 | 1/2014 |
| EP | 3170640 A1 | 5/2017 |
| JP | S57128522 A | 8/1982 |
| WO | 2013103799 A1 | 7/2013 |
| WO | 2015105899 A1 | 7/2015 |

OTHER PUBLICATIONS

European Patent Office, Search Report in EP Application 22210763.3, dated May 15, 2023, 7 pages, The Hague.

*Primary Examiner* — Stella K Yi
(74) *Attorney, Agent, or Firm* — Marshall & Melhorn, LLC

(57) ABSTRACT

A seat system for a vehicle including a seat back assembly, a seat base assembly, and a headrest assembly. Each of the assemblies may include at least one formed part for providing comfort to an occupant of the seat system. A coated forming tool for producing the formed part of the seat system may be a mold assembly or a printing machine configured to form at least a portion of the formed part of the seat system. The coating of the coated forming tool comprises at least one of a nonstick or ecological material, and more preferably a polytetrafluroethylene (PTFE) material.

16 Claims, 3 Drawing Sheets

COATED FORMING TOOL

FIELD

The presently disclosed subject matter relates to a forming tool, and more particularly to a coated forming tool for a vehicle seat system.

BACKGROUND

Conventional vehicle seat systems include a seat back assembly connected to a seat base assembly and a headrest assembly connected to the seat back assembly. The assemblies of the seat system typically comprise foam parts. Such foam parts serve as padding for the seat system and provide an occupant of the seat system with a desired level of seating comfort. Generally, the seat system includes a foam part for the seat base assembly and a foam part separate therefrom for the seat back assembly. Each of the two foam parts has a central region and two side bolsters. In the foam part for the seat base assembly, a central region of the foam part supports an underside of a buttocks and a rear thigh region of the occupant, whilst the two side bolsters laterally bear against a respective one of the thighs of the occupant. As a result, the two side bolsters able to absorb transverse forces on the occupant, in particular during cornering. In the foam part for the seat back assembly, a central region of the foam part supports a back of the occupant, whilst the two side bolsters laterally bear against the back and, as a result, are able to absorb transverse forces on the occupant. The foam parts may comprise one or more layers, each having a certain hardness and density. The foam parts may include a plurality of holes formed in the central region for improving properties of the seat system such as to convey moisture or permit a desired compression thereof, for example.

Typically, the foam parts of the seat system are formed from a polyurethane material. A drawback of the polyurethane material is that it adheres to various forming tools used in a forming process of the foam parts. For example, as the foam part is formed, the polyurethane material, and thereby the foam part, undesirably adheres to a mold used to produce the foam parts of the seat system and ventilation pins disposed in the mold for degassing purposes. Currently, a mold release material is deposited over surfaces of the tools (e.g. the mold and the ventilation pins) to combat the undesired adhesion of the polyurethane material.

Accordingly, it would be desirable to produce a coated forming tool, which simplifies manufacturability and decreases costs, while improving ease of maintenance.

SUMMARY

In concordance and agreement with the present disclosure, a coated forming tool, which simplifies manufacturability and decreases costs, while improving ease of maintenance, has surprisingly been discovered.

In one embodiment, a coated forming tool for producing a part of a seat system, comprising: a mold assembly configured to form at least a portion of the part of the seat system; and a coating deposited over at least a portion of a surface of the mold assembly, wherein the coating comprises at least one of a nonstick material and an ecological material.

In another embodiment, a method of producing a part of a seat system, comprises: providing at least one forming tool having a cavity formed therein, wherein the at least one forming tool includes a coating deposited over at least a portion of a surface thereof, and wherein the coating comprises at least one of a nonstick material and an ecological material; disposing a forming material into at least a portion of the cavity of the at least one forming tool; and forming the part of the seat system by an expansion of the material in the at least one forming tool.

As aspects of certain embodiments, the coating comprises at least a polytetrafluroethylene (PTFE) material.

As aspects of certain embodiments, the coating has a thickness in a range of about 2 thousandths of an inch (2 mils) to about 3.5 thousandths of an inch (3.5 mils).

As aspects of certain embodiments, the mold assembly includes an upper mold and a lower mold configured to cooperate with the upper mold to form a cavity therebetween, and wherein the cavity has a shape, size, and configuration to produce the at least a portion of the part of the seat system.

As aspects of certain embodiments, the at least a portion of the part of the seat system is a cushioning member configured to be disposed on a seat frame of the seat system.

As aspects of certain embodiments, the at least a portion of the part is produced from a polypropylene material.

As aspects of certain embodiments, further comprising at least one ventilation component configured to cooperate with the mold assembly.

As aspects of certain embodiments, the at least one ventilation component includes a coating deposited over at least a portion of a surface thereof.

As aspects of certain embodiments, the coating of the at least one ventilation component comprises at least one of a nonstick material and an ecological material.

As aspects of certain embodiments, the coating of the at least one ventilation component comprises at least a polytetrafluroethylene (PTFE) material.

As aspects of certain embodiments, the coating of the at least one ventilation component has a thickness in a range of about 2 thousandths of an inch (2 mils) to about 3.5 thousandths of an inch (3.5 mils).

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
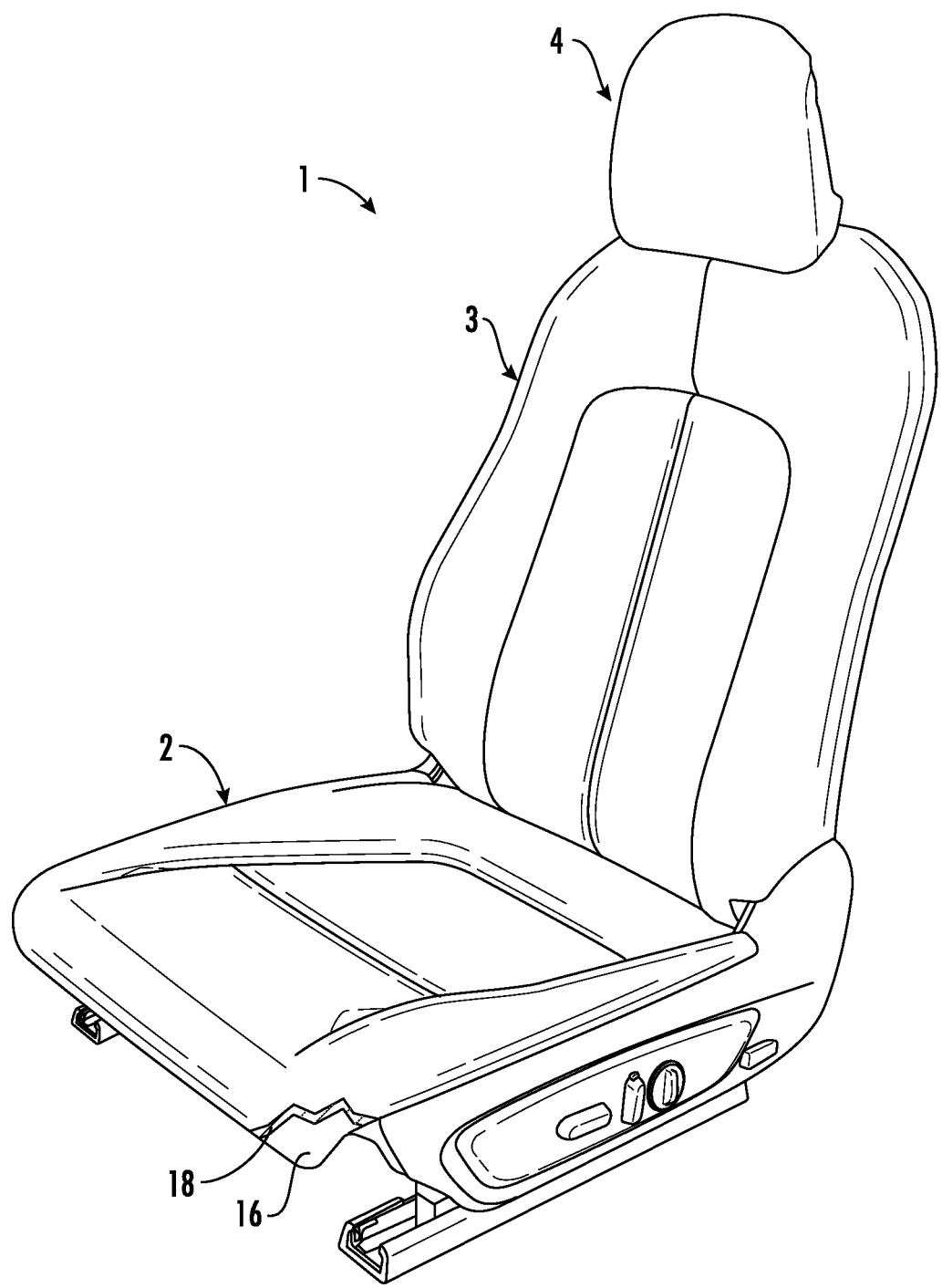
FIG. 1 is a perspective view of a seat system including a seat base assembly, a seat back assembly, and a headrest assembly, wherein at least one of the assemblies includes a foam part.

It is to be understood that the presently disclosed subject matter may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

FIG. 1 shows a seat system 1 for a motor vehicle (not depicted) according to an embodiment of the presently described subject matter. The seat system 1 may comprise a seat base assembly 2, a seat back assembly 3, and a headrest assembly 4. The seat back assembly 3 may be coupled to the seat base assembly 2 and the headrest assembly 4. In certain embodiments, the seat base assembly 2 may be movable relative to a floorboard of the vehicle, the seat back assembly 3 may be movable relative to the seat base assembly 2, and the headrest assembly 4 may be movable relative to the seat back assembly 3. The seat base assembly 2 may be configured to support a buttock portion and thigh portion of an occupant. The seat back assembly 3 may be configured to support a back region of the occupant.

In certain embodiments, each of the seat base assembly 2, the seat back assembly 3, and the headrest assembly 4 may include a formed part 16 (e.g. a foam part, a printed part, and the like, etc.) disposed on a seat structure (not depicted) and a seat cover 18 disposed over the formed part 16. Additional formed parts 16 may be used in the seat base assembly 2, the seat back assembly 3, and the headrest assembly 4, if desired. The formed parts 16 may be produced from any suitable forming material as desired such as a polyurethane material and a polymer material, for example. Preferably, each of the formed parts 16 may be produced from an expandable polyurethane material or resin. It should be appreciated that each of the formed parts 16 may have any size, shape, configuration, and thickness as desired.

Figure 2:
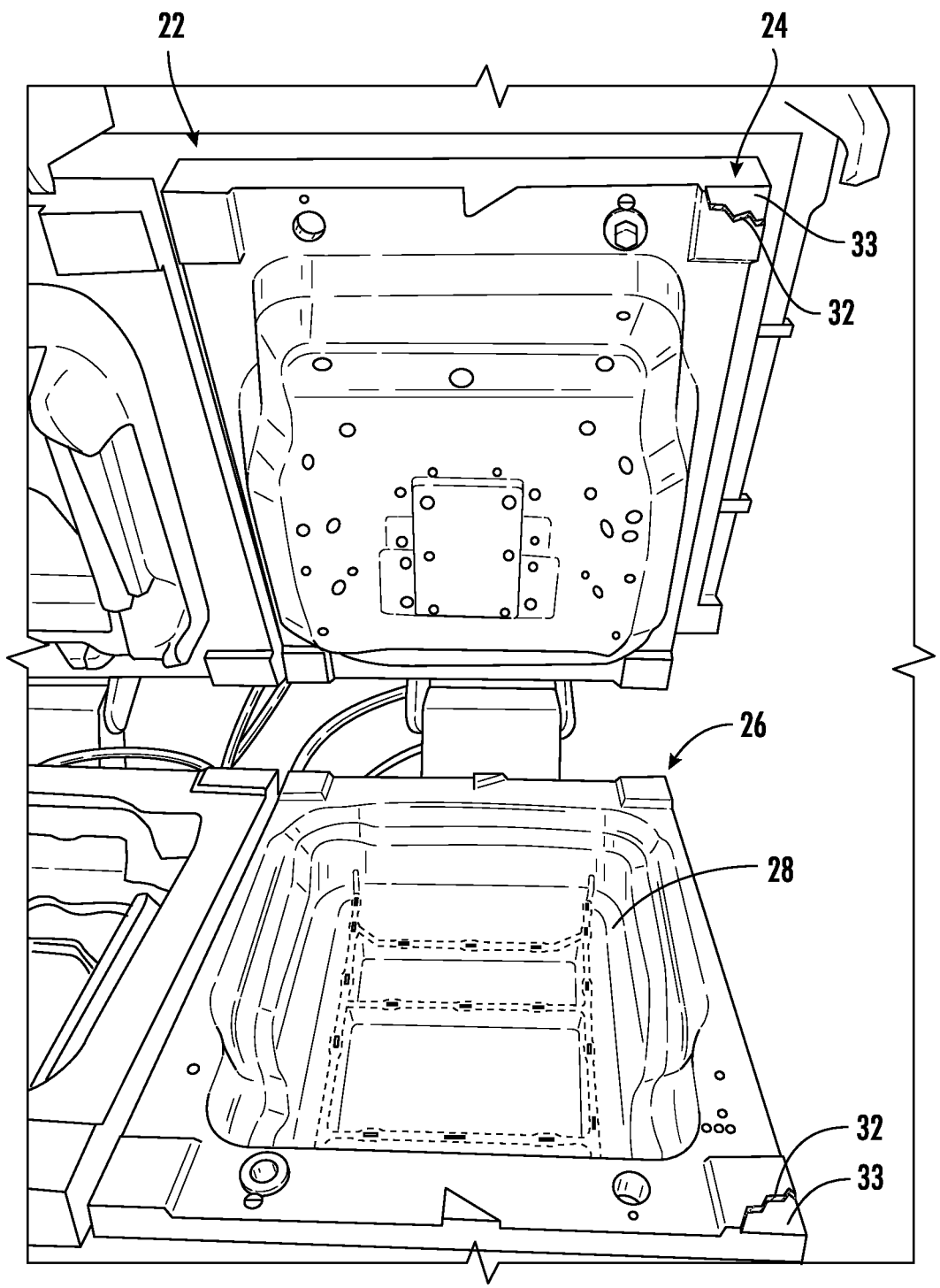
FIG. 2 is a front perspective view of a coated forming tool according to an embodiment of the presently described subject matter.
Figure 4:
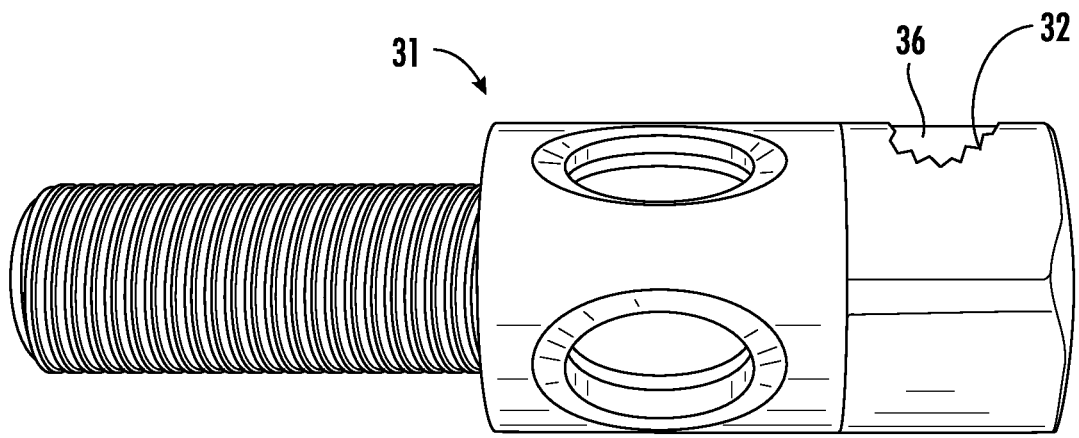
FIG. 4 is a side elevational view of a coated pin having a port formed therein according to an embodiment of the presently described subject matter, wherein the coated pin is configured to be used with the coated forming tool of FIG. 1.
Figure 5:
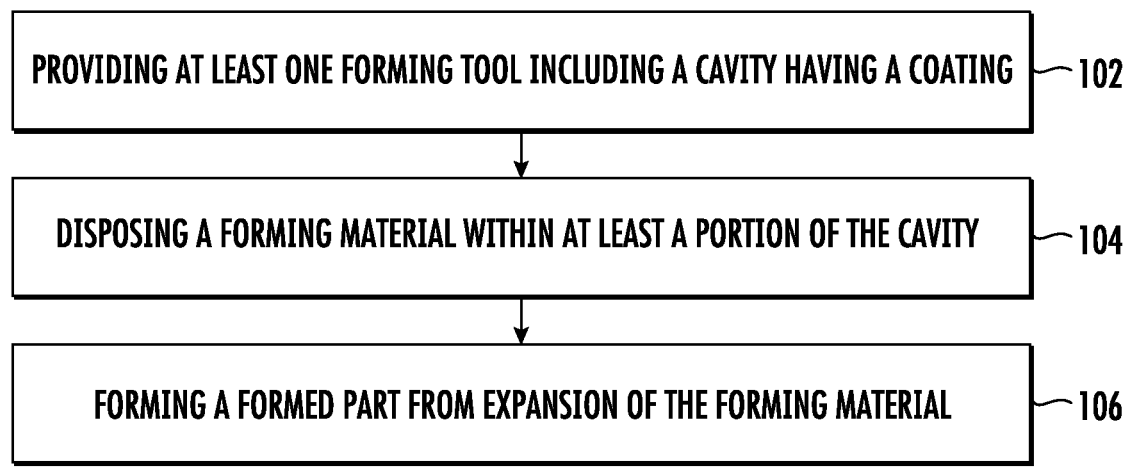
FIG. 5 is a flow diagram of a method of producing a part of a seat system.

A method 100 for producing the formed part 16 shown in FIG. 5 will be described hereinafter. It is understood that other methods for producing the formed part 16 may be employed as desired. The method 100 employs at least one forming tool for producing at least a portion of the formed part 16. In an embodiment show in FIG. 2, the at least one forming tool may be a mold assembly 22. The mold assembly 22 may include an upper first mold 24 and a lower second mold 26. The mold assembly 22 may include more or less molds than shown, if desired. In other embodiments, the at least one forming tool may be the mold assembly 22 including at least one ventilation component (e.g. a pin 30 shown in FIG. 3 and/or a port element 31 shown in FIG. 4), disposed therein. It should be appreciated that each of the molds 24, 26 and the at least one ventilation components 30, 31 may be formed from any suitable material as desired such as a metal material (e.g. aluminum material), for example. In yet another embodiment, the at least one forming tool may be a three-dimensional printing machine (not depicted) configured to produce a printed formed part 16.

A cavity 28 may be defined in at least one of the molds 24, 26 or between the molds 24, 26 when the molds 24, 26 are closed. The cavity 28 has any suitable size, shape, and configuration to allow for an expansion of the forming material, and thereby a molding of the formed part 16 when the molds 24, 26 are closed. In certain embodiments, the cavity 28 is of a size, shape, and configuration of a cushioning member for a vehicle seat.

Figure 3:
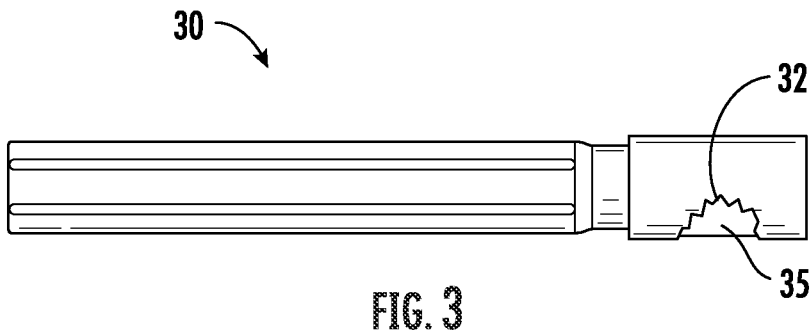
FIG. 3 is a side elevational view of a coated pin according to an embodiment of the presently described subject matter, wherein the coated pin is configured to be used with the coated forming tool of FIG. 1.

A coating 32 may be deposited over at least a portion of a surface 33 of the at least one forming tool. In certain embodiments, the coating 32 may be deposited over at least a portion of a surface 33 of at least one of the first mold 24 and the second mold 26 of the mold assembly 22 shown in FIG. 2. In other embodiments, the coating 32 may also be deposited over at least a portion of a surface 35 of the pin 30, as shown in FIG. 3. In yet other embodiments, the coating 32 may also be deposited over at least a portion of a surface 36 of the port element 31, shown in FIG. 4. In yet further embodiments, the coating 32 may be deposited over at least a portion of a surface of the three-dimensional printing machine. The coating 32 may be deposited over the at least a portion of the surface 33 of the mold assembly 22, the surfaces 35, 36 of the ventilation components 30, 31, respectively, and/or the surface of the three-dimensional printing machine by any suitable means such as chemical vapor deposition (CVD), physical vapor deposition (PVD), high velocity oxygen fuel coating process, plasma or thermal spray, and the like, for example. The coating 32 militates against an adhesion of the forming material to the at least one forming tool. More particularly, the coating 32 may militate against an adhesion of the forming material to the at least one forming tool by sealing the surface 33 of the mold assembly 22, the surfaces 35, 36 of the ventilation components 30, 31, respectively, and/or the surface of the three-dimensional printing machine. This sealing of the surfaces is especially critical at thinner areas, areas with tighter radiuses, and/or other areas of the at least one forming tool and the at least one ventilation component 30, 31 where undesired adhesion of the forming material is likely. Accordingly, the coating 32 may also reduce volatile organic compound (VOC) emissions, scrap, repair and labor, and failure frequency of the at least one ventilation component 30, 31.

In certain embodiments, the coating 32 comprises a nonstick material. Various nonstick materials may be used for the coating 32. In certain embodiments, the coating 32 may comprise a polytetrafluoroethylene (PTFE) material such as Teflon® made by Chemours™, for example. In other embodiments, the coating 32 may comprise an ecological coating material such as a coating produced by Cerakote, for example. The coating 32 may have a thickness in a range of about 2 thousandths of an inch (2 mils) to about 3.5 thousandths of an inch (3.5 mils). Preferably, the coating 32 has a thickness of about 2.5 thousandths of an inch (2.5 mils) to about 3 thousandths of an inch (3 mils) to allow the formed part 16 to be easily removed from the coated forming tool without affecting the method 100 of forming or a final formed part 16. It should be appreciated, however, that the coating 32 may have any suitable thickness to achieve the desired nonstick properties.

The method 100 may include step 102 of providing the at least one forming tool including the coating 32. When the at least one forming tool is the mold assembly 22, the molds 24, 26 may be closed prior to or after step 104. At step 104, the forming material is disposed within at least a portion of the cavity 28 defined by the molds 24, 26. At step 106, the forming material expands within the cavity 28 and is formed into the formed part 16. In certain embodiments, the expansion of the forming material within the cavity 28 is caused or accelerated by heat. During the expansion of the forming material, a gas or gaseous mixture within the cavity 28 may be discharged through the at least one ventilation component 30, 31. Therefore, the forming material may be able to entirely fill the cavity 28 without having pockets of the gas or gaseous mixture which may cause defective expansion and a deformed part.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed is:

1. A method of producing a part of a seat system, comprising:
    providing at least one forming tool having a cavity formed therein,
    wherein the at least one forming tool comprises a mold assembly,
    wherein at least one ventilation component is disposed in the mold assembly,
    wherein the at least one forming tool includes a coating deposited over at least a portion of a surface thereof,
    wherein the coating comprises at least one of a nonstick material and an ecological material,
    wherein the at least one ventilation component comprises a pin,
    wherein the at least one ventilation component comprises a coating deposited over at least a portion of a surface of the at least one ventilation component,
    disposing a forming material into at least a portion of the cavity of the at least one forming tool; and
    forming the part of the seat system by an expansion of the forming material in the at least one forming tool.

2. The method of claim 1, wherein the coating comprises at least a polytetrafluroethylene (PTFE) material.

3. The method of claim 1, wherein the coating has a thickness in a range of about 2 thousandths of an inch (2 mils) to about 3.5 thousandths of an inch (3.5 mils).

4. The method of claim 1, wherein the at least a portion of the part of the seat system is a cushioning member configured to be disposed on a seat frame of the seat system.

5. The method of claim 1, wherein the at least a portion of the part is produced from a polypropylene material.

6. The method of claim 1, wherein the coating of the at least one ventilation component comprises at least one of a nonstick material and an ecological material.

7. The method of claim 1, wherein the coating of the at least one ventilation component comprises at least a polytetrafluroethylene (PTFE) material.

8. The method of claim 1, wherein the coating of the at least one ventilation component has a thickness in a range of about 2 thousandths of an inch (2 mils) to about 3.5 thousandths of an inch (3.5 mils).

9. The method of claim 1, wherein the coating of the at least one ventilation component is configured to seal a surface of the pin.

10. The method of claim 1, wherein the coating of the at least one ventilation component is deposited over the at least a portion of the surface of the at least one ventilation component by at least one of (a) chemical vapor deposition; (b) physical vapor deposition; (c) a high velocity oxygen fuel coating process (d) plasma spray; (e) thermal spray.

11. The method of claim 1, wherein the ventilation component is formed from a metal material.

12. The method of claim 1, wherein the coating of the at least one ventilation component is configured to (a) reduce volatile organic compound emissions: (b) reduce scrap; (c) reduce repair; (d) reduce labor; and/or (e) reduce failure frequency of the at least one pin.

13. The method of claim 1, wherein during the expansion of the forming material, a gas or gaseous mixture is discharged through the pin.

14. The method of claim 1, wherein the pin comprises a port formed therein.

15. The method of claim 1, wherein the pin comprises an aperture.

16. The method of claim 1, wherein the pin comprises a threaded portion.

* * * * *